(12) United States Patent
Hoult

(10) Patent No.: US 9,080,631 B2
(45) Date of Patent: Jul. 14, 2015

(54) DAMPER UNIT

(71) Applicant: McLaren Automotive Limited, Woking (GB)

(72) Inventor: Will Hoult, Woking (GB)

(73) Assignee: MCLAREN AUTOMOTIVE LIMITED, Woking (GB)

( * ) Notice: Subject to any disclaimer, the term of this patent is extended or adjusted under 35 U.S.C. 154(b) by 0 days.

(21) Appl. No.: 14/010,236

(22) Filed: Aug. 26, 2013

(65) Prior Publication Data

US 2014/0238795 A1    Aug. 28, 2014

(30) Foreign Application Priority Data

Feb. 26, 2013    (GB) .................................. 1303400.4

(51) Int. Cl.
| | |
|---|---|
| *F16F 9/26* | (2006.01) |
| *B60G 11/06* | (2006.01) |
| *B60G 17/08* | (2006.01) |
| *B60G 21/06* | (2006.01) |
| *F16F 9/06* | (2006.01) |

(52) U.S. Cl.
CPC . *F16F 9/26* (2013.01); *B60G 11/06* (2013.01); *B60G 17/08* (2013.01); *B60G 21/06* (2013.01); *F16F 9/06* (2013.01); *B60G 2300/27* (2013.01)

(58) Field of Classification Search
CPC ............... F16F 9/26; F16F 9/06; F16F 9/486; F16F 9/063
USPC .......... 188/269, 297, 322.12, 322.17, 322.18, 188/322.19, 304; 267/64.11, 64.25, 64.26; 280/124.162
See application file for complete search history.

(56) References Cited

U.S. PATENT DOCUMENTS

| | | | | |
|---|---|---|---|---|
| 3,163,412 A | * | 12/1964 | Troy | 267/256 |
| 3,273,876 A | * | 9/1966 | Hannan | 267/186 |
| 3,559,776 A | | 2/1971 | Schultze | |

(Continued)

FOREIGN PATENT DOCUMENTS

| | | |
|---|---|---|
| DE | 4029490 | 9/1990 |
| JP | 02236035 | 9/1990 |

(Continued)

OTHER PUBLICATIONS

Search Report and Written Opinion dated Jun. 15, 2010 in corresponding PCT Application No. PCT/2010/022054.

(Continued)

*Primary Examiner* — Thomas J Williams
*Assistant Examiner* — Mariano Sy
(74) *Attorney, Agent, or Firm* — Dergosits & Noah LLP

(57) ABSTRACT

A damper unit includes first and second chambers, a first piston dividing the first chamber into first and second volumes, and a second piston dividing the second chamber into third and fourth volumes. Each piston is moveable along the respective chamber. The second chamber has a cross-sectional area that is smaller than the cross-sectional area of the first chamber so that the second chamber at least partially slides inside the first chamber and at least part of the first chamber can be located around the outside of the second chamber. The first piston is attached to the part of the second chamber that slides inside the first chamber. The position of the second piston is fixed relative to the first chamber as the second chamber slides relative to first chamber. The length of the damper unit changes as the second chamber slides relative to the first chamber.

21 Claims, 3 Drawing Sheets

(56) References Cited

U.S. PATENT DOCUMENTS

| | | | |
|---|---|---|---|
| 4,054,277 A | | 10/1977 | Sirven |
| 4,305,486 A | * | 12/1981 | Cowan ................ 188/282.1 |
| 4,662,486 A | | 5/1987 | Stenberg |
| 4,721,322 A | * | 1/1988 | Hawkins ................ 280/276 |
| 4,736,931 A | * | 4/1988 | Christopherson ............... 267/34 |
| 4,786,037 A | * | 11/1988 | Mills .............................. 267/226 |
| 4,887,515 A | * | 12/1989 | Tabata .............................. 92/80 |
| 4,923,038 A | | 5/1990 | Lizell |
| 5,024,460 A | | 6/1991 | Hanson et al. |
| 5,148,896 A | | 9/1992 | Ralph |
| 5,163,538 A | | 11/1992 | Derr et al. |
| 5,163,706 A | | 11/1992 | Maguran, Jr. et al. |
| 5,195,619 A | | 3/1993 | Dourson et al. |
| 5,282,645 A | | 2/1994 | Spakowski et al. |
| 5,472,070 A | | 12/1995 | Feigel |
| 5,477,949 A | | 12/1995 | Forster et al. |
| 5,586,627 A | | 12/1996 | Nezu et al. |
| 5,588,510 A | | 12/1996 | Wilke |
| 5,730,261 A | | 3/1998 | Spakowski et al. |
| 5,901,820 A | | 5/1999 | Kashiwagi et al. |
| 5,924,528 A | | 7/1999 | Vermolen et al. |
| 6,155,391 A | | 12/2000 | Kashiwagi et al. |
| 6,279,703 B1 | * | 8/2001 | Mete ......................... 188/319.1 |
| 6,283,259 B1 | | 9/2001 | Nakadate |
| 6,321,888 B1 | | 11/2001 | Reybrouck et al. |
| 6,427,986 B1 | | 8/2002 | Sakai et al. |
| 6,464,048 B1 | | 10/2002 | Grooves et al. |
| 6,527,093 B2 | | 3/2003 | Oliver et al. |
| 6,837,343 B1 | | 1/2005 | Bugaj |
| 6,851,529 B2 | | 2/2005 | Jones et al. |
| 6,938,887 B2 | * | 9/2005 | Achenbach ................ 267/64.22 |
| 7,073,643 B2 | * | 7/2006 | Schel ............................ 188/304 |
| 2005/0056504 A1 | | 3/2005 | Holiviers |
| 2005/0121268 A1 | | 6/2005 | Groves |
| 2005/0173214 A1 | | 8/2005 | Lemmens et al. |
| 2006/0108190 A1 | * | 5/2006 | Forster ........................... 188/318 |
| 2007/0000743 A1 | | 1/2007 | Naitou et al. |
| 2007/0017760 A1 | | 1/2007 | Runkel |
| 2007/0084687 A1 | | 4/2007 | Foster et al. |
| 2009/0084643 A1 | | 4/2009 | Bugaj |
| 2009/0200760 A1 | | 8/2009 | Gartner et al. |
| 2011/0147148 A1 | | 6/2011 | Ripa |

FOREIGN PATENT DOCUMENTS

| | | |
|---|---|---|
| JP | 2007506055 | 3/2007 |
| KR | 1020000055863 | 9/2000 |
| WO | 2011/039498 | 4/2011 |

OTHER PUBLICATIONS

Search Report and Written Opinion dated Jan. 23, 2009 in corresponding PCT Application No. PCT/2008/008740.

Search Report and Written Opinion dated Aug. 12, 2013 in corresponding PCT Appliction No. PCT/2013/039625.

* cited by examiner

DAMPER UNIT

CROSS-REFERENCE TO RELATED APPLICATIONS

This patent application claims priority to Great Britain Patent Application GB 1303400.4, filed Feb. 26, 2013, entitled "Damper Unit," which is incorporated by reference.

BACKGROUND

This invention relates to a damper unit suitable for use in a suspension system of a vehicle.

BRIEF SUMMARY OF THE INVENTION

A typical vehicle includes a suspension system between the wheels and body of the vehicle. The wheels are typically mounted on bearings and the bearings are attached to the body of the vehicle via a suspension linkage which supports the body of the vehicle on the bearings. The suspension linkage will usually include dampers that are used to control the travel of the suspension system and thus improve the ride quality of the vehicle, the grip of the tyres because of improved tyre contact with the ground, and the handling because of improved control of the motion of the body of the vehicle. The suspension linkage may also include components such as springs to also control the motion of the vehicle's body relative to the wheels. For example, the vehicle may have four wheels and be provided with a double wishbone suspension at each of the four wheels. The double wishbone suspension will be coupled between the bearing of the wheel and the body of the vehicle to allow the wheel to move relative to the body of the vehicle. A damper unit may be connected between one of the wishbones of the suspension and the body of the vehicle to control the movement of the wheel relative to the body of the vehicle.

During the motion of the vehicle, the vehicle may be subject to heave, roll, pitch and warp. The vehicle may include one or more dampers in the suspension linkages that can be used to provide independent stiffness and damping for heave, roll, pitch and warp. Such a system is described in WO2011/039498. This document describes a configuration of a damper unit that has two separate chambers. Each chamber has a piston associated with it which divides the chamber into two volumes. The chambers have a piston rod common to the two chambers. One mounting point for the damper is fast with the damper housing that defines the two chambers. The other mounting point for the damper is fast with the piston rod. The distance between these two mounting points alters when the piston rod moves in and out of the damper housing. The common piston rod causes both of the pistons in the damper unit to move in unison. The two separate chambers are shown as being positioned one on top of the other and having a common axis.

WO2011/039498 also describes the configuration of the system that connects the chambers of the damper units together. This system can be hydraulic, pneumatic or a combination of the two. For example, one chamber may be hydraulic while the other is pneumatic. A two-chamber damper unit as described is provided at each of the four wheels of the car. At the front of the vehicle one chamber of the left damper unit is connected to one chamber of the right damper unit using straight connections. I.e. the top volume of the left chamber is connected to the top volume of the right chamber and the bottom volume of the left chamber is connected to the bottom volume of the right chamber. Thus providing stiffness and damping in heave when combined with accumulators and restrictions between the various volumes. The other chamber of the left damper unit is connected to the other chamber of the right damper unit using cross-over connections. I.e. the top volume of the left chamber is connected to the bottom volume of the right chamber and the bottom volume of the left chamber is connected to the top volume of the right chamber. Thus providing stiffness and damping in roll when combined with accumulators and restrictions between the various volumes. This document also describes connections between the front and rear cross-over connections. The restrictions on the connections between the damper units are described to provide damping together with accumulators on the connections to provide stiffness. These restrictions or orifices or damping valves can be located at the damper units or on the connections therebetween. Also described, is the front and rear heave circuits determining pitch stiffness together with the system being able to provide zero warp stiffness.

In the above described system, the travel of the damper units is limited by the length of the shorter of the two chambers. Therefore, in effect, the two chambers have the same length of travel. This can also be seen by the two chambers sharing a common damper rod. If the two damper chambers are placed one on top of the other then the damper unit needs to be at least twice as long as the maximum travel of the complete damper unit. Such a length may be undesirable if such a length cannot be easily accommodated in the suspension system of a vehicle. For example, such a length may be undesirable in high performance cars where low vehicle height is important. The length of the damper unit can be reduced by reducing wheel travel and so the maximum travel of the damper unit or by using mechanical advantage to reduce damper travel. Alternatively, two separate damper units may be used side-by-side. However, in each case there are design compromises that are made, for example by having a much wider package size or reduced travel.

It would be desirable to have a damper unit for use in a system that provides independent stiffness and damping for both heave and roll that provides a desirable length of travel while being compact in package size.

According to a first aspect of the present invention, there is provided a damper unit comprising: a first chamber; a second chamber; a first piston dividing the first chamber into a first volume and a second volume, and a second piston dividing the second chamber into a third volume and a fourth volume, each piston being moveable along the length of the respective chamber to vary the size of the respective volumes; wherein the second chamber has a cross-sectional area, in a plane perpendicular to the length of the second chamber, that is smaller than the cross-sectional area, in a plane perpendicular to the length of the first chamber, of the first chamber so that the second chamber at least partially slides inside the first chamber and at least part of the first chamber can be located around the outside of the second chamber; the first piston is attached to the part of the second chamber that slides inside the first chamber; the position of the second piston is fixed relative to the first chamber as the second chamber slides relative to first chamber; and the length of the damper unit changes as the second chamber slides relative to the first chamber.

The damper unit may comprise a first connection between one of the first volume or the second volume and the exterior of the damper unit, the first connection being capable of providing coupling for fluid within the first chamber with apparatus external to the damper unit. The damper unit may comprise a second connection between the second volume and the exterior of the damper unit, the second connection being capable of providing coupling for fluid within the first chamber with apparatus external to the damper unit, and wherein the first connection may be between the first volume and the exterior of the damper unit.

The damper unit may comprise a third connection between one of the third volume or the fourth volume and the exterior of the damper unit, the third connection being capable of providing coupling for fluid within the second chamber with apparatus external to the damper unit. The damper unit may comprise a fourth connection between the fourth volume and the exterior of the damper unit, the fourth connection being capable of providing coupling for fluid within the second chamber with apparatus external to the damper unit, and wherein the third connection may be between the third volume and the exterior of the damper unit.

The damper unit may comprise a damper rod that passes through the first chamber, is sealingly received through a bore in the first piston and passes into the second chamber, the damper rod may be attached to the second piston within the second chamber, wherein the damper rod may be fast with the first chamber and fixes the position of the second piston relative to the first chamber. The damper rod may be attached to an end wall of the first chamber that is farthest from the second chamber.

The first and second chambers may be generally cylindrical and have axes that are parallel. The first and second chambers may share a common axis in the axial direction of the cylinders. The first and second pistons may be movable in the axial direction. The second volume may be defined by the space enclosed by the first chamber, first piston and the outside of the second chamber. The second chamber may be sealingly received through an aperture in an end wall of the structure defining the first chamber that is closest to the second chamber.

The third connection may be between the third volume and the exterior of the damper unit; at least the part of the second chamber that can slide inside the first chamber may be bounded by a structure having a double wall and the third connection may run through the void between the double wall; and the third connection may be connected to the third volume by an aperture in the inner wall of the structure at the end of the third volume farthest from the second piston.

The first piston may be attached to the end of the second chamber that slides inside the first chamber. A portion of the first piston may be integral to the end wall of the second chamber that is located closest to the first chamber. The first piston may be movable along part of the physical length of the first chamber. The second piston may be movable along part of the physical length of the second chamber.

The damper unit may comprise a first mounting point fast with the first chamber and a second mounting point fast with the second chamber, wherein the distance between the first mounting point and the second mounting point changes as the second chamber slides relative to the first chamber.

The damper unit may comprise a resilient biasing means attached between points on the first chamber and the second chamber. The resilient biasing means may comprise a spring. The damper unit may comprise spring seats attached to the outside of the first and second chambers and wherein the resilient biasing means may be attached using the spring seats.

The fluid within the first chamber and/or the second chamber may be hydraulic fluid. The fluid within the first chamber and/or the second chamber may be air. The fluid within at least one of the first, second, third and fourth volumes may be different to the fluid within the other of the first, second, third and fourth volumes. The fluid in at least one of the first, second, third and fourth volumes may be air and the fluid within the other of the first, second, third and fourth volumes may be hydraulic fluid.

A suspension system for a vehicle may comprise at least two of the damper units described herein and a fluid interconnection system, wherein the chambers of one of the damper units may be connected to the chambers of another of the damper units by the fluid interconnection system.

Aspects of the present invention will now be described by way of example with reference to the accompanying figures.

BRIEF DESCRIPTION OF THE FIGURES

In the figures, like reference numerals indicate like parts.

DETAILED DESCRIPTION

The following description is presented to enable any person skilled in the art to make and use the system, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
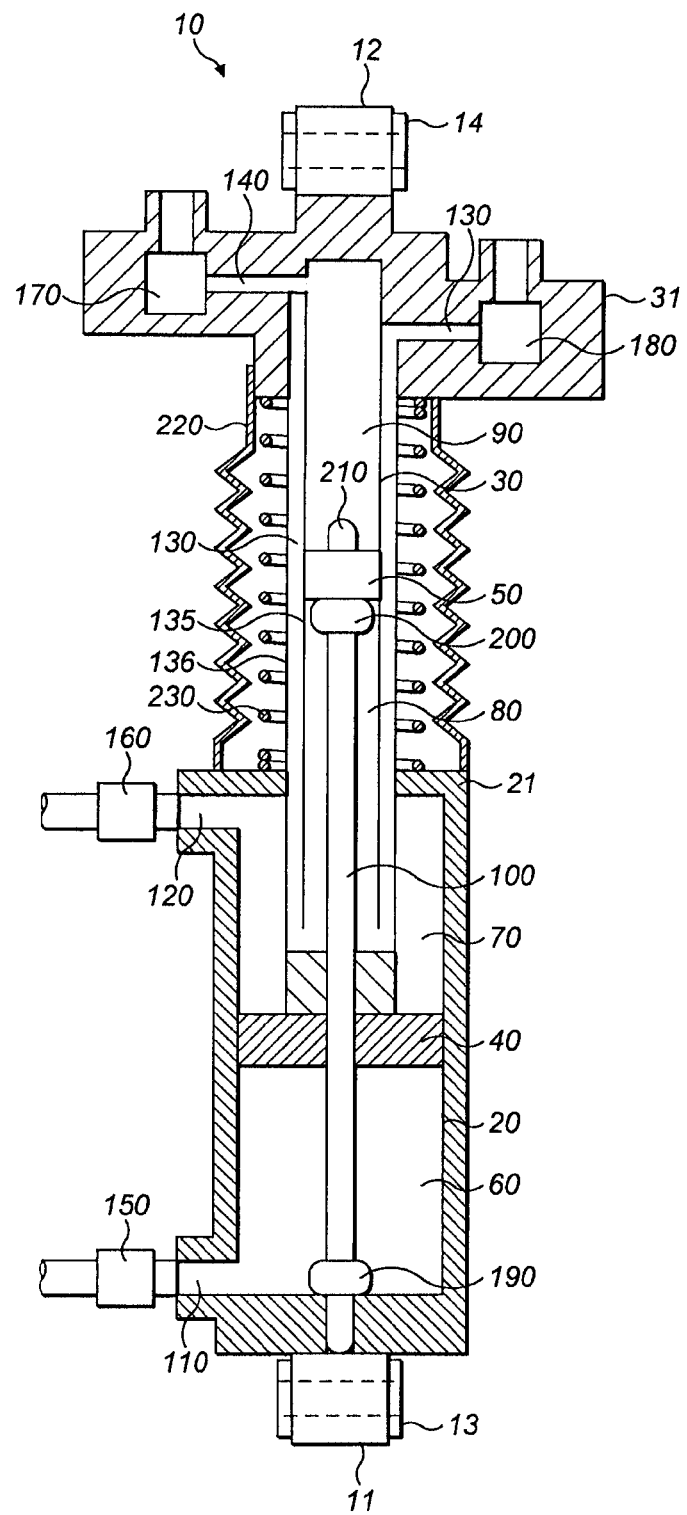
FIG. 1 is a schematic diagram of a damper unit.

FIG. 1 shows a schematic diagram of a damper unit 10. The damper unit 10 has mounting points 11 and 12 by which the damper unit 10 may be attached to parts of a structure that can move relative to each other. For example, it may be attached between points on a suspension system for a vehicle. These mounting points 11 and 12 can move relative to each other by virtue of the structure of the damper unit 10 described herein. Typically the motion of these mounting points 11 and 12 relative to each other will be towards and away from each other along a straight line that passes through the two mounting points 11 and 12. Typically the mounting points 11 and 12 will each be provided with a bushing 13 and 14 made of some elastomeric material to provide an amount of damping to the fixing made at the mounting points 11 and 12.

The damper unit 10 has two damper chambers 20 and 30. The first damper chamber 20 is defined, in part, by the first chamber casing 21. This first chamber casing 21 is located around the outside of the first damper chamber 20. The first mounting point 11 is rigidly connected to the first damper chamber casing 21. It is shown as being directly connected to the first damper chamber casing 21 in FIG. 1. However, the first mounting point 11 may be remote from the first damper chamber casing 21 and rigidly connected to the first chamber casing 21 by a connecting rod. Such connection will be made as required to package the damper unit 10 to fit in the structure in which the damper unit 10 is to be deployed. The second damper chamber 30 is defined by the second damper chamber casing 31. The second mounting point 12 is rigidly connected to the second damper chamber casing 31. It is shown as being directly connected to the second damper chamber casing 31 in FIG. 1. However, the second mounting point 12 may be remote from the second damper chamber casing 31 and rigidly connected to the first chamber casing 31 by a connecting rod. Such connection will be made as required to package the damper unit 10 to fit in the structure in which the damper unit 10 is to be deployed. The second damper chamber casing 31 is shown as having a tubular section that extends away from the second mounting point 12 towards the first mounting point 11. It is this tubular section that defines the majority of the second chamber 30. A smaller portion of the second chamber 30 is defined by the part of the second chamber casing 31 that connects to the second mounting point 12. This part of the second chamber casing 31 that connects to the second mounting point 12 is more substantial to provide the necessary resilience to the second mounting point 12.

The chambers 20 and 30 are generally cylindrical. In FIG. 1 the axes of the two cylinders are shown as being generally parallel with a line between the two mounting points 11 and 12. In this case the primary direction of motion of the mounting points 11 and 12 is along this line. If the mounting points 11 and 12 are offset then the primary direction of motion of these mounting points may be along a line that does not run through both of the two mounting points 11 and 12. In which case, the axes of the two cylinders may be parallel to this primary direction of motion. The axes of the two chambers 20 and 30 are shown in FIG. 1 as having a common axis. The two chambers 20 and 30 having a common axis and this axis being parallel with a line between the two mounting points 11 and 12 has the advantage of reducing any lateral forces during compression of the damper unit 10.

First chamber 20 has a diameter that is larger than the diameter of the second chamber 30. This means that the part of the damper unit defining the second, smaller damper chamber 30 can slide inside the part of the damper unit defining the first, larger damper cylinder. As shown in FIG. 1, second chamber casing 31 can slide inside first chamber casing 21. This configuration means that during at least part of the range of motion of the damper unit at least part of the first damper chamber 20 is arranged coaxially within the second damper chamber 30. The first and second chambers 20 and 30 may have a cross section that is non-circular and so not fully cylindrical. For example, the cross-section of the chambers may be oval, rectangular or an irregular two-dimensional shape having notches and cut outs. In which case the second chamber 30 can be defined as having a cross-sectional area, in a plane perpendicular to the length of the second chamber 30, that is smaller than the cross-sectional area, in a plane perpendicular to the length of the first chamber 20, of the first chamber 20 so that the second chamber 30 at least partially slides inside the first chamber 20 and at least part of the first chamber 20 can be located around the outside of the second chamber 30. The direction of the length of the two chambers being in the primary direction of movement of the first mounting point 11 relative to the second mounting point 12 during compression and extension of the damper unit 10. The second chamber 20 is received through an aperture in the end wall of the structure defining the first chamber, the first chamber casing 21, that is closest to the second mounting point. This aperture has shape that matches the cross-sectional area of the second chamber 20 so that the outside of the second chamber 20 forms a seal with the aperture. A seal may be present in the aperture to provide a fluid tight seal.

Each chamber 20 and 30 has a damper piston 40 and 50 associated with it. The first chamber 20 has first piston 40. The first piston 40 is able to slide along the length of the first chamber 20. The second chamber has second piston 50. The second piston 50 is able to slide along the length of the second chamber 30. It should be noted that the length that first and second pistons 40 and 50 are able to slide may only be part of the physical length of the first and second chambers 20 and 30 respectively. This restriction on moveable length may be to allow for connections with the first and/or second chambers and to provide room for any end stops that are required to protect the ends of the chambers.

The partial coaxial arrangement of the first damper cylinder with the second damper cylinder allows the overall length of the damper unit to be reduced. Such a configuration permits the overall length of the damper unit to be less than twice as long as the maximum travel of the damper unit. Alternatively, at a minimum the overall length of the damper unit is reduced due to the overlapping of some components in this design of damper unit.

The first piston 40 divides first chamber 20 into two volumes: a first volume 60 and second volume 70. The first volume 60 is the part of first chamber 20 located closest to the first mounting point 11, or alternatively described as farthest from the second chamber 30. The second volume 70 is the part of first chamber 20 located closest to second mounting point 12, or alternatively described as closest to the second chamber 30. The second volume 70 is also defined by the outer surface of the portion of the second chamber casing 31 that projects into the first chamber 20. In the case of the generally cylindrical chambers 20 and 30 shown in FIG. 1 the second volume defined by the first chamber casing 21, first piston 40 and the outer surface of the second chamber casing 31 is generally hollow circular cylinder shaped and is located coaxially around the outside of the second chamber 30. The amount of the second chamber 30 that the second volume is located around the outside of will vary depending on the extension of the damper unit 10. When the damper unit 10 is fully extended the second chamber 30 may be located outside of the first chamber 20 and the second volume 70 may only be located coaxially around the second chamber casing 31.

The end of the second, smaller chamber 30 that is disposed within the first, larger chamber 20 forms part of the first piston 40. The first piston 40 also extends radially outward from the periphery of the second chamber 30 to the full width of the first chamber 40. The first piston 40 can be a separate piece that is attached directly or indirectly to the end of the second chamber 30. First piston 40 may be attached to the end of the second chamber 30 by a rod to space the first piston 40 away from the end of second chamber 30.

Whilst first piston 40 is shown in FIG. 1 as being located at the end of the second, smaller chamber 30, it should be understood that first piston 40 may be attached to the outside of any part of the second chamber 30 that is always located within the first chamber. In this case, the first piston 40 will be formed around the outside of the second chamber 30. The first piston 40 can have a hollow centre with a shape corresponding to that of the outside of the second chamber 30. In the case of the generally cylindrical chambers 20 and 30 shown in FIG. 1 the first piston 40 will have a generally hollow circular shape.

The second piston 50 divides second chamber 30 into two volumes: a third volume 80 and fourth volume 90. The third volume 80 is the part of the second chamber 30 located closest to the first mounting point 11, or alternatively described as closest to the first chamber 20. The fourth volume 90 is the part of the second chamber 30 located closest to the second mounting point 12, or alternatively described as farthest from the first chamber 20.

As the second chamber 30 slides relative to the first chamber 20, during compression and extension of the damper unit 10, the relative size of the first, second, third and fourth volumes 60, 70, 80 and 90 will alter as the position of the first and second pistons 40 and 50 move within the first and second chambers 20 and 30.

The first chamber casing 21 bears a damper rod 100 which passes through the first chamber, is sealingly received through first piston 40 and passes into second chamber 30. Damper rod 100 could pass through a bore in the first piston 40 sized such that it forms a seal between the damper rod 100 and the first piston 40. It may be that a rubber grommet or other seal is attached to the bore to provide the seal between the first piston 40 and the damper rod 100. This stops fluid flow through the bore. A small, but insubstantial, amount of fluid may flow from one side of the first piston 40 to the other, for example a thin film of fluid on the damper rod 100 may pass from one side of the first piston 40 to the other during the motion of the first piston 100. However, as long as this amount of fluid is insubstantial compared to the volume of fluid on either side of the first piston 40 then this is still considered to be sealingly received.

In FIG. 1 the rod 100 runs along the common axis of the two chambers. However, it may be offset from this position as required to accommodate other components of the damper unit 10. The part of rod 100 that is disposed within the second chamber 30 is attached to second piston 50. This rod fixes the position of the second piston 50 relative to the position of the first chamber 20. This means that second piston 50 is constrained to move together with the first chamber 20. As shown in FIG. 1, rod 100 does not need to extend all the way through the second chamber 30 but only so far as the second piston 50. In other words, as shown in FIG. 1, rod 100 does not need to pass through the end of the second chamber closest to the second mounting point 12 and farthest from the first chamber 20. Alternatively, the rod 100 could extend past the second piston 50. In such a situation the rod 100 may pass through the end of the second chamber closest to the second mounting point 12 during at least part of the range of travel of the damper unit 10.

Whilst a rod 100 is shown in FIG. 1 to fix the position of second piston 50 other devices could be used to fix the position of second piston 50. For example, if second piston 50 was located within the bounds of first chamber, wires or rods could extend through sealed slots in the sides of the second chamber to fix the second piston 50 in place. Alternatively, the second piston 50 could be held in place with an electromagnet or a permanent magnet.

As illustrated in FIG. 1, each chamber 20 and 30 has a pair of ports that permit the flow of fluid in and out of the damper unit 10. First chamber 20 has a first connection 110 between the first volume 60 and the exterior of the damper unit 10 and a second connection 120 between the second volume 70 and the exterior of the damper unit 10. Second chamber 30 has a third connection 130 between the third volume 80 and the exterior of the damper unit 10 and a fourth connection 140 between the fourth volume 90 and the exterior of the damper unit 10. The exterior of the damper unit 10 being taken to be mean the periphery of the damper unit 10. These connections may be the only ways in which fluid can flow in and out of the various volumes. In other words, there may be no direct connections within the damper unit 10 between the four volumes 60, 70, 80 and 90. These connections are capable of providing coupling for fluid within the first and second chambers 20 and 30 respectively with apparatus external to the damper unit 10. The first connection 110 is connected to the first chamber 20 so that the connection 110 is present in the first volume 60 independent of the position of the first piston 40. The second connection 120 is connected to the first chamber 20 so that the connection 120 is present in the second volume 70 independent of the position of the first piston 40. The third connection 130 is connected to the second chamber 30 so that the connection 130 is present in the third volume 80 independent of the position of the second piston 50. The fourth connection 140 is connected to the second chamber 30 so that the connection 140 is present in the fourth volume 90 independent of the position of the second piston 50.

In the case of the first chamber 20 as illustrated in FIG. 1, the first and second connections 110 and 120 can be ports in the sidewall of the first chamber 20 that pass through the first chamber casing 21. In the case of the second chamber 30 as illustrated in FIG. 1, the fourth connection 140 passes out of the side of the end of the second chamber 30 located closest to the second mounting point 12 and though the second chamber casing 31. The third connection 130 is provided by the outer surface of the second chamber 30 being a twin tube. The inner tube surface 135 provides the boundary of the second chamber 30. The cavity 136 created by the twin tube provides a channel for fluid to flow through creating the third connection 130. This cavity allows fluid to be collected from the end of the second chamber farthest from the second mounting point 12 and pass out of a port located in the part of the second chamber casing 31 located close to the second mounting point 12.

Each of the connections 110, 120, 130 and 140 can have the flow of fluid restricted by a restriction shown schematically as the valves at 150, 160, 170 and 180 in FIG. 1. These valves may be part of damper unit 10 as shown for the third and fourth valves 180 and 170. Alternatively they could be external to the damper unit 10 as shown for the first and second valves 150 and 160. These restrictions may be actively controlled valves that can alter the resistance applied to fluid flowing through the valve in response to external inputs or may be fixed restrictions that have a set resistance. These restrictions may not be required in certain systems. The volumes will be filled with fluid. This fluid may be hydraulic fluid or may be air in the case of a pneumatic system. One chamber may be filled with hydraulic fluid while the other chamber is filled with air. Any combination of hydraulic fluid and air in the volumes is envisaged by the present invention. In the case of a completely air based system however separate damping may be required because air on its own may not have sufficient viscosity to provide sufficient damping to the system connected to the damper unit 10.

Whilst FIG. 1 shows each chamber 20 and 30 having a pair of ports, one or both of chambers 20 and 30 may only have one port respectively that permits the flow of fluid in and out of the damper unit 10. In this case, first chamber 20 may have only the first connection 110 between the first volume 60 and the exterior of the damper unit 10 or have only second connection 120 between the second volume 70 and the exterior of the damper unit 10. Second chamber 30 may have only the third connection 130 between the third volume 80 and the exterior of the damper unit 10 or have only the fourth connection 140 between the fourth volume 90 and the exterior of the damper unit 10. The volume(s) in one or both of chambers 20 and 30 that does not have a connection will be filled with a compressible fluid to permit the movement of the pistons 40 and 50. An example of such a compressible fluid is air. One or both of chambers 20 and 30 may have no ports respectively that permit the flow of fluid in and out of the damper unit 10. In this case, first chamber 20 may have connections between the first 60 and second 70 volumes that permit fluid flow between the two volumes. Second chamber 30 may have connections between the third 80 and fourth 90 volumes that permit fluid flow between the two volumes. The volumes could be filled with a compressible fluid either in combination with the connections between the volumes or not in combination.

The damper unit 10 may be provided with end stops 190 and 200 to provide an amount of shock resistance in the case of the damper unit 10 bottoming or topping out. A first end stop 190 may be attached around damper rod 100 at the end of the first chamber 20 that is located closest to the first mounting point 11. A second end stop 200 may be located around damper rod 100 on the side of the second piston 50 closest to the first chamber 20. These end stops 190 and 200 can be used purely to provide protection against metal to metal contact at the end of the range of motion of the damper unit 100. The end stops 190 and 200 in this case may be only thick enough to avoid the pistons 40 and 50 or nut 210 contacting with the inside of the first and second chambers 20 and 30. These end stops 190 and 200 can also be used to tune the stiffness characteristics of the damper unit 100 when the damper unit 100 approaches the ends of its travel. In this case the end stops 190 and 200 may be thicker and so control the motion of the damper unit 100 along part of its length. The end stops 190 and 200 can be made of an elastomeric material which can be selected to have particular stiffness properties. The second piston 50 may be secured to the damper rod 100 by nut 210. In this case damper rod 100 can have a threaded end to which nut 210 can screwed on. The length of nut 210 may be accommodated by the nut 210 passing through the end of the second chamber closest to the second mounting point 12 during part of the range of travel of the damper unit 10.

The damper unit 10 can also include a spring 230 to provide additional stiffness to the damper unit 10. As illustrated in FIG. 1, the spring 230 can be attached between points on the first and second chambers 20 and 30. Where these points are located along the length, of the first and second chambers 20 and 30 will depend on the length of spring 230 that is to be used in the damper unit 10. One end of spring 230 could be attached to the end of the first chamber 20 closest to the second mounting point 12. The other end of spring 230 could be attached to a point on the second chamber 30 remote, from the spring 230 attachment point on the first chamber 20 at a distance that from the attachment point on the first chamber 20 that allows for the length of spring 230 that is required for the length of travel of the damper unit 10. The spring 230 may be long enough that it runs the length of the damper unit 10 and the spring 230 may be attached between a point near the end of the first chamber 20 closest to the first mounting point 11 and a point near the end of the second chamber 30 closest to the second mounting point 12. The first chamber casing 21 may have a first spring seat to accept one end of the spring 230. The second chamber casing 31 may have a second spring seat to accept the other end of the spring 230. The use of a spring 230 will provide additional resistance to the motion of the first chamber 10 relative to the second chamber 20. The spring 230 will provide support for at least some of the static load on the damper unit 10 when used in a suspension system. This reduces the static load that will need to be supported by the fluid system connected to the damper unit 10. Other resilient biasing means may be used instead of a spring 230. The end stops 190 and 200 can be used to alter the stiffness properties of the spring 230 when the damper unit 10 reaches the ends of its travel.

The part of the second chamber casing 31 that slides into and out of the first chamber casing 21 can be covered by a boot 220. This protects the surface of this part of the second chamber casing 31 from debris. The boot 220 can also envelop the spring 230 when used as shown in FIG. 1. Alternatively, the boot 220 may be placed inboard of the spring 230. I.e. between the spring 230 and the chamber casings 21 and 31.

Figure 3:
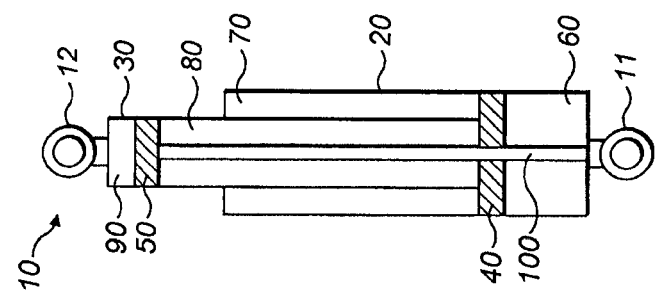
FIG. 3 shows a schematic diagram of a damper unit in a compressed configuration.
Figure 2:
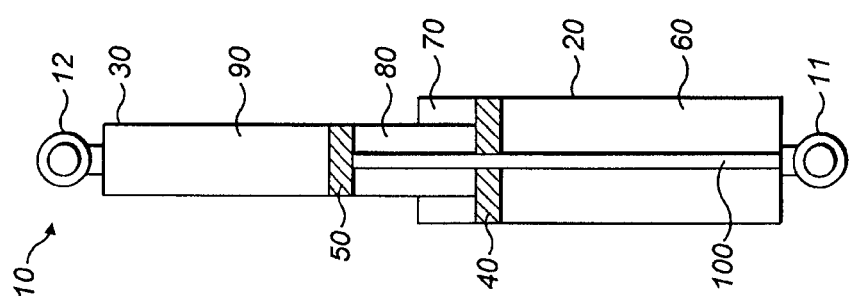
FIG. 2 shows a schematic diagram of a damper unit in an extended configuration.

The range of motion of the damper unit 10 and the variation in size of the volumes of the first and second chambers will now be described with reference to FIGS. 2 and 3. In FIGS. 2 and 3 the connections for fluid have been removed for clarity. FIG. 2 shows a schematic diagram of a damper unit 10 in an extended configuration. In this configuration the first volume 60 is larger than second volume 70 and the fourth volume 90 is larger than third volume 80. When the damper unit 10 is compressed first and second mounting points 11 and 12 move closer together reducing the distance between the mounting points 11 and 12 and the overall length of the damper unit 10. During this compression motion first piston 40 is moved along the first chamber 20 towards the first mounting point end of the first chamber 20 by virtue of being attached to the second chamber 30. Second piston 50 is moved along the second chamber 30 towards the second mounting point end of the second chamber 30 by virtue of being attached to the end of damper rod 100. During this compression motion of the damper unit 10, the size of the second volume 70 increases relative to the size of first volume 60 which decreases in size and the size of the third volume 80 increases relative to the size of fourth volume 90 which decreases in size. FIG. 3 shows a schematic diagram of a damper unit 10 in a compressed configuration after the aforementioned compression of damper unit 10 has occurred. During an extension motion of damper unit 10 the relative change in size of the volumes described above will be reversed and the damper unit 10 will return to a configuration illustrated generally in FIG. 2. The volumes that increase during these motions will draw fluid in via their respective connections while the volumes that decrease during these motions will expel fluid via their respective connections. Damping can be provided by resisting the motion of this fluid.

Although throughout this description the unit 10 is described as a damper unit, it should be understood that the damper unit 10 is more generally capable of being a force providing unit. When connected to a system such as that described below with reference to FIG. 4, the damper unit 10 has a primary function of providing both stiffness as well as damping.

Figure 4:
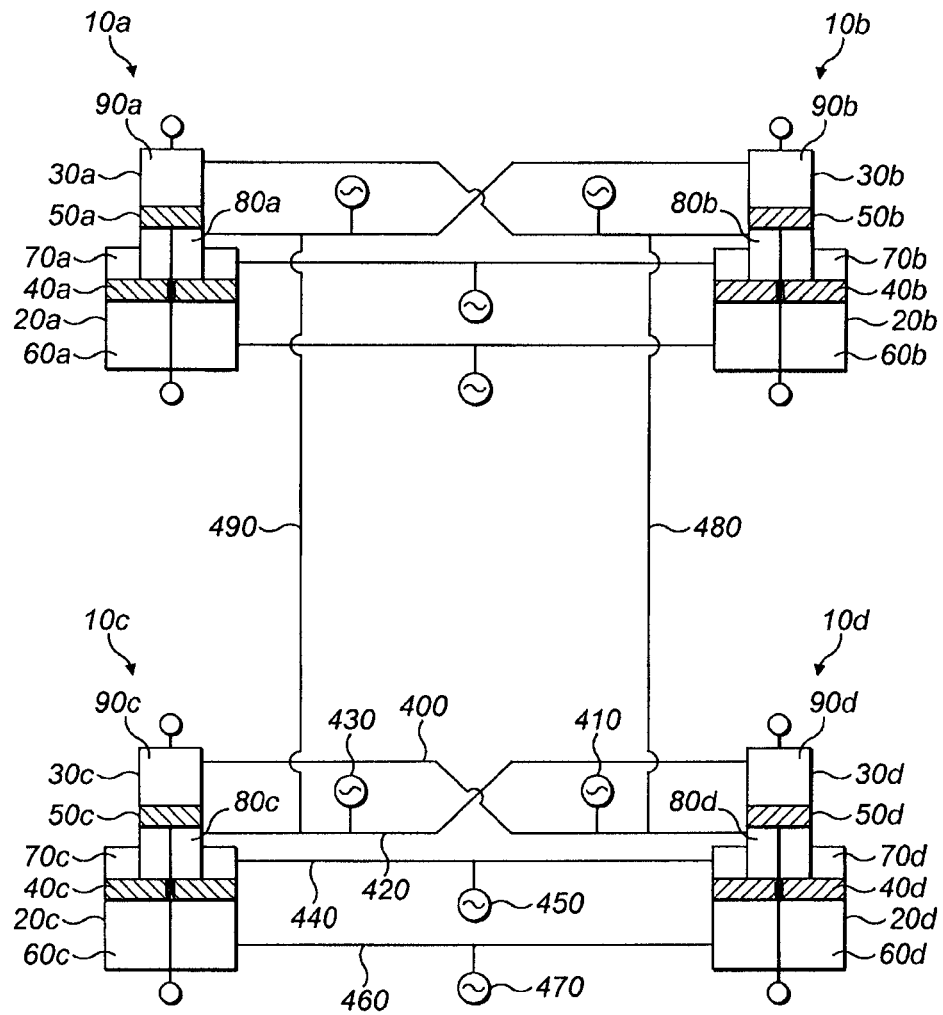
FIG. 4 shows a schematic hydraulic circuit diagram together with damper units.

FIG. 4 shows a schematic hydraulic circuit diagram together with damper units. This hydraulic circuit is a typical arrangement that can be used to provide roll and heave stiffness using the two chamber damper units described above. As illustrated in FIG. 4, this hydraulic circuit employs a damper unit at each of the four wheels of the vehicle. Damper units 10a and 10b are used in the suspension systems associated with left and right front wheels respectively. Damper units 10c and 10d are used in the suspension systems associated with the left and right rear wheels respectively. For like parts where the same numeric values are used in reference numerals these indicate like parts to earlier figures. The letters a, b, c and d in the reference numerals of FIG. 4 are used to differentiate between front, rear and left, right. In FIG. 4 the connections for fluid in the damper units have been removed for clarity. It should be noted that restrictions such as the valves illustrated in FIG. 1 will also be present on at least some of the connections. At least one restriction is required on each hydraulic circuit to provide resistance to the flow of the hydraulic fluid.

The hydraulic circuit will now be described with reference to the rear left and right damper units 10c and 10d. It should be understood that the same description can apply to the front left and right damper units 10a and 10b. In FIG. 4 a first hydraulic line 400 is connected between the fourth volume 90c of the rear left damper unit 10c and the third volume 80d of the rear right damper unit 10d. An accumulator 410 is connected to the first hydraulic line 400 to compensate for any difference in volume between the opposite sides of the second chambers 30c and 30d. A second hydraulic line 420 is connected between the third volume 80c of the rear left damper unit 10c and the fourth volume 90d of the rear right damper unit 10d. An accumulator 430 is connected to the second hydraulic line 420 to compensate for any difference in volume between the opposite sides of the second chambers 30c and 30d. The accumulators 410 and 430 contain gas or air that is compressed by the fluid entering the accumulators 410 and 430. Fluid may enter or flow out of the accumulators 410 and 430 for a number of other reasons and thus compressing the gas or air or allowing the gas or air to expand. The accumulators 410 and 430 allow for thermal compensation for any changes in fluid volume due to a change in fluid temperature. The accumulators 410 and 430 take up excess fluid in the event of one or more corners moving independently of the other corners of the vehicle. The accumulators 410 and 430 can also be used to permit controlled changes to system properties. For example, the ride height of the vehicle could be lowered by a change in the amount of fluid present in accumulators 410 and 430 at the same time as the pressure of the air or gas being increased thus causing an increase in stiffness.

The hydraulic connections of first and second hydraulic lines 410 and 420 together form the cross-over connected hydraulic circuit in which one of the volumes on one side the piston of one chamber of one damper unit is connected to the volume on the other side of the piston of one chamber of another damper unit. The third and fourth volumes together with the accumulators 410 and 430 will provide stiffness for roll with this cross-over connected hydraulic connection circuit. The hydraulic circuits for roll at the front of the vehicle may be connected to the hydraulic circuits for roll at the rear of the vehicle by hydraulic connections 480 and 490. The first of these hydraulic connections 480 connects the hydraulic circuit connected to the fourth volume 90a of the front left damper unit 10a to the hydraulic circuit 400 connected to the fourth volume 90c of the rear left damper unit 10c. The second of these hydraulic connections 490 connects the hydraulic circuit connected to the third volume 80a of the front left damper unit 10a to the hydraulic circuit connected to the third volume 80a of the rear left damper unit 10c. These front-to-rear hydraulic connections allow for very low or zero stiffness in warp.

In FIG. 4 a third hydraulic line 440 is connected between the second volume 70c of the rear left damper unit 10c and the second volume 70d of the rear right damper unit 10d. An accumulator 450 is connected to the third hydraulic line 440 to compensate for any change in volume in the two second volumes 70c and 70d that occurs during the motion of the vehicle. A fourth hydraulic line 460 is connected between the first volume 60c of the rear left damper unit 10c and the first volume 60d of the rear right damper unit 10d. An accumulator 470 is connected to the fourth hydraulic line 460 to compensate for any change in volume in the two first volumes 60c and 60d that occurs during the motion of the vehicle. The accumulators 450 and 470 contain gas or air that is compressed by the fluid entering the accumulators 450 and 470. Fluid may enter or flow out of the accumulators 450 and 470 for a number of other reasons and thus compressing the gas or air or allowing the gas or air to expand. The accumulators 450 and 470 allow for thermal compensation for any changes in fluid volume due to a change in fluid temperature. The accumulators 450 and 470 take up excess fluid in the event of one or more corners moving independently of the other corners of the vehicle. The accumulators 450 and 470 can also be used to permit controlled changes to system properties. For example, the ride height of the vehicle could be lowered by a change in the amount of fluid present in accumulators 450 and 470 at the same time as the pressure of the air or gas being increased thus causing an increase in stiffness.

The hydraulic connections of third and fourth hydraulic lines 440 and 460 together form the straight connected hydraulic circuit in which one of the volumes on one side of the piston of one chamber of one damper unit is connected to the volume on the same side of the piston of one chamber of another damper unit. The first and second volumes together with accumulators 450 and 470 will provide stiffness for heave with this straight connected hydraulic circuit.

In the above description of the hydraulic circuit the first and second volumes have been connected by the straight connected hydraulic circuit and the third and fourth volumes have been connected by the cross-over connected hydraulic circuit. However, the opposite may also be used whereby the third and fourth volumes are connected by the straight connected hydraulic circuit and the first and second volumes have been connected by the cross-over connected hydraulic circuit. Additionally the front dampers may be connected with the first and second volumes using one of the straight or cross-over connected hydraulic circuit and the rear dampers may be connected with the first and second volumes using the other one of the straight or cross-over connected hydraulic circuit. The same applies to the third and fourth volumes.

Whilst the above description of FIG. 4 has described the circuit as a hydraulic circuit it should be understood that a pneumatic circuit could replace one or both of the roll and heave circuits described above. In the case of air replacing a hydraulic fluid the accumulators described above may not be required because the pneumatic volume can be accommodated through the whole circuit of chambers and pipework.

Whilst FIG. 4 shows each chamber 20 and 30 having a pair of ports, one or both of chambers 20 and 30 may only have one port each that permits the flow of fluid in and out of the chamber, as described earlier. In this case only some of the connections outlined above will be required.

It should be noted that due to the presence of the second chamber 30 within the first chamber 20 the surface area of the first piston 40 on the second volume 70 side is smaller than the surface area of the first piston 40 on the first volume 60 side. This difference in piston surface area means that there is a net vertical force when there is equal pressure on opposite sides of the first piston 40 within the first chamber 20. When the damper unit is used as part of a suspension system, this net vertical force provides support to the sprung mass; in the case of a vehicle, the body of the vehicle. The presence of the damper rod 100 in the third volume 80 causes the surface area of the second piston 50 on the third volume 80 side to be smaller than the surface area of the second piston 50 on the fourth volume 90 side. This difference in piston surface area will also cause a further net vertical force that can further contribute to the support provided. This net vertical force may be enough to support the static load. However, as detailed above the damper unit 10 may be provided with a spring 230 which can provide part of the support for the static load.

In the case of a vehicle using the damper units 10, the use of a spring 230 can also be advantageous so that the car moves to a flat position when stationary. Whilst the net vertical force described above may be sufficient to support the static load, it can be difficult to balance the loads on the fluid in the damper such that the vehicle is level in roll when stationary. The springs 230 can be used to provide the bias required to level the vehicle in roll at rest or in motion when there is no lateral acceleration.

As can be appreciated, there are many aspects and embodiments of the invention. Presented below in example claim format are various embodiments and aspects of the invention. The invention may include any one or combination of the aspects recited.

1. A damper unit comprising:
a first chamber;
a second chamber;
a first piston dividing the first chamber into a first volume and a second volume, and a second piston dividing the second chamber into a third volume and a fourth volume, each piston being moveable along the length of the respective chamber to vary the size of the respective volumes;
wherein the second chamber has a cross-sectional area, in a plane perpendicular to the length of the second chamber, that is smaller than the cross-sectional area, in a plane perpendicular to the length of the first chamber, of the first chamber so that the second chamber at least partially slides inside the first chamber and at least part of the first chamber can be located around the outside of the second chamber; the first piston is attached to the part of the second chamber that slides inside the first chamber; the position of the second piston is fixed relative to the first chamber as the second chamber slides relative to first chamber; and the length of the damper unit changes as the second chamber slides relative to the first chamber.

2. A damper unit according to claim 1, comprising a first connection between one of the first volume or the second volume and the exterior of the damper unit, the first connection being capable of providing coupling for fluid within the first chamber with apparatus external to the damper unit.

3. A damper unit according to claim 2, comprising a second connection between the second volume and the exterior of the damper unit, the second connection being capable of providing coupling for fluid within the first chamber with apparatus external to the damper unit, and wherein the first connection is between the first volume and the exterior of the damper unit.

4. A damper unit according to any preceding claim, comprising a third connection between one of the third volume or the fourth volume and the exterior of the damper unit, the third connection being capable of providing coupling for fluid within the second chamber with apparatus external to the damper unit.

5. A damper unit according to claim 4, comprising a fourth connection between the fourth volume and the exterior of the damper unit, the fourth connection being capable of providing coupling for fluid within the second chamber with apparatus external to the damper unit, and wherein the third connection is between the third volume and the exterior of the damper unit.

6. A damper unit according to any preceding claim, comprising a damper rod that passes through the first chamber, is sealingly received through a bore in the first piston and passes into the second chamber, the damper rod being attached to the second piston within the second chamber, wherein the damper rod is fast with the first chamber and fixes the position of the second piston relative to the first chamber.

7. A damper unit according claim 6, wherein the damper rod is attached to an end wall of the first chamber that is farthest from the second chamber.

8. A damper unit according to any preceding claim, wherein the first and second chambers are generally cylindrical and have axes that are parallel.

9. A damper unit according to claim 8, wherein the first and second chambers share a common axis in the axial direction of the cylinders.

10. A damper unit according to claims 8 or 9, wherein the first and second pistons are movable in the axial direction.

11. A damper unit according to any preceding claim, wherein the second volume is defined by the space enclosed by the first chamber, first piston and the outside of the second chamber.

12. A damper unit according to any preceding claim, wherein the second chamber is sealingly received through an aperture in an end wall of the structure defining the first chamber that is closest to the second chamber.

13. A damper unit according to any preceding claim as dependent on claim 4, wherein the third connection is between the third volume and the exterior of the damper unit; at least the part of the second chamber that can slide inside the first chamber is bounded by a structure having a double wall and the third connection runs through the void between the double wall; and the third connection is connected to the third volume by an aperture in the inner wall of the structure at the end of the third volume farthest from the second piston.

14. A damper unit according to any preceding claim, wherein the first piston is attached to the end of the second chamber that slides inside the first chamber.

15. A damper unit according to any preceding claim, wherein a portion of the first piston is integral to the end wall of the second chamber that is located closest to the first chamber.

16. A damper unit according to any preceding claim, wherein the first piston is movable along part of the physical length of the first chamber.

17. A damper unit according to any preceding claim, wherein the second piston is movable along part of the physical length of the second chamber.

18. A damper unit according to any preceding claim, comprising a first mounting point fast with the first chamber and a second mounting point fast with the second chamber, wherein the distance between the first mounting point and the second mounting point changes as the second chamber slides relative to the first chamber.

19. A damper unit according to any preceding claim, comprising a resilient biasing means attached between points on the first chamber and the second chamber.

20. A damper unit according to claim 19, wherein the resilient biasing means comprises a spring.

21. A damper unit according to claims 19 or 20, comprising spring seats attached to the outside of the first and second chambers and wherein the resilient biasing means is attached using the spring seats.

22. A damper unit according to any preceding claim, wherein the fluid within the first chamber and/or the second chamber is hydraulic fluid.

23. A damper unit according to any of claims 1 to 21, wherein the fluid within the first chamber and/or the second chamber is air.

24. A damper unit according to any preceding claim, wherein the fluid within at least one of the first, second, third and fourth volumes is different to the fluid within the other of the first, second, third and fourth volumes.

25. A damper unit according to claim 24, wherein the fluid in at least one of the first, second, third and fourth volumes is air and the fluid within the other of the first, second, third and fourth volumes is hydraulic fluid.

26. A suspension system for a vehicle comprising at least two damper units according to any preceding claim and a fluid interconnection system, wherein the chambers of one of the damper units are connected to the chambers of another of the damper units by the fluid interconnection system.

27. A damper unit as substantially described herein with reference to FIGS. 1 to 4.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A damper unit comprising:
   a first chamber;
   a second chamber;
   a first piston dividing the first chamber into a first volume and a second volume, and a second piston dividing the second chamber into a third volume and a fourth volume, each piston being moveable along a length of the respective chamber to vary the size of the respective volumes;
   a first connection between the first volume and the exterior of the damper unit and a second connection between the second volume and the exterior of the damper unit, the first and second connections being capable of providing coupling for fluid within the first chamber with apparatus external to the damper unit; and
   a third connection between the third volume and the exterior of the damper unit and a fourth connection between the fourth volume and the exterior of the damper unit, the third and fourth connections being capable of providing coupling for fluid within the second chamber with apparatus external to the damper unit;
   wherein the second chamber has a cross-sectional area, in a plane perpendicular to the length of the second chamber that is smaller than the cross-sectional area of the first chamber, in a plane perpendicular to the length of the first chamber, so that the second chamber at least partially slides inside the first chamber and at least part of the first chamber can be located around the outside of the second chamber; the first piston is attached to the part of the second chamber that slides inside the first chamber; the position of the second piston is fixed relative to the first chamber as the second chamber slides relative to first chamber; and the length of the damper unit changes as the second chamber slides relative to the first chamber; and
   wherein at least the part of the second chamber that can slide inside the first chamber is bounded by a structure having a double wall and the third connection runs through a void between the double wall; and the third connection is connected to the third volume by an aperture in the inner wall of the structure at the end of the third volume farthest from the second piston.

2. A damper unit according to claim 1, comprising a damper rod that passes through the first chamber, is sealingly received through a bore in the first piston and passes into the second chamber, the damper rod being attached to the second piston within the second chamber, wherein the damper rod fixes the position of the second piston relative to the first chamber.

3. A damper unit according claim 2, wherein the damper rod is attached to an end wall of the first chamber that is farthest from the second chamber.

4. A damper unit according to claim 1, wherein the first and second chambers are generally cylindrical, each cylinder having an axis, and the first and second chambers having axes that are parallel.

5. A damper unit according to claim 4, wherein the first and second chambers share a common axis in the axial direction of the cylinders.

6. A damper unit according to claim 4, wherein the first and second pistons are movable in the axial direction.

7. A damper unit according to claim 1, wherein the second volume is defined by a space enclosed by the first chamber, first piston and the outside of the second chamber.

8. A damper unit according to claim 1, wherein a structure defines the first chamber that is closest to the second chamber, and wherein the second chamber is sealingly received through an aperture in an end wall of the structure defining the first chamber that is closest to the second chamber.

9. A damper unit according to claim 1, wherein the first piston is attached to the end of the second chamber that slides inside the first chamber.

10. A damper unit according to claim 1, wherein a portion of the first piston is integral to an end wall of the second chamber that is located closest to the first chamber.

11. A damper unit according to claim 1, wherein the first piston is movable along part of a physical length of the first chamber.

12. A damper unit according to claim 1, wherein the second piston is movable along part of a physical length of the second chamber.

13. A damper unit according to claim 1, comprising a first mounting point connected to the first chamber and a second mounting point connected to the second chamber, wherein a distance between the first mounting point and the second mounting point changes as the second chamber slides relative to the first chamber.

14. A damper unit according to claim 1, comprising a resilient biasing means attached between points on the first chamber and the second chamber.

15. A damper unit according to claim 14, wherein the resilient biasing means comprises a spring.

16. A damper unit according to claim 14, comprising spring seats attached to the outside of the first and second chambers and wherein the resilient biasing means is attached using the spring seats.

17. A damper unit according to claim 1, wherein the fluid within the first chamber and/or the second chamber is hydraulic fluid.

18. A damper unit according to claim 1, wherein the fluid within the first chamber and/or the second chamber is air.

19. A damper unit according to claim 1, wherein the fluid within at least one of the first, second, third and fourth volumes is different to the fluid within the other of the first, second, third and fourth volumes.

20. A damper unit according to claim 19, wherein the fluid in at least one of the first, second, third and fourth volumes is air and the fluid within the other of the first, second, third and fourth volumes is hydraulic fluid.

21. A suspension system for a vehicle comprising at least two damper units according to claim 1 and a fluid interconnection system, wherein the chambers of one of the damper units are connected to the chambers of another of the damper units by the fluid interconnection system.

* * * * *